US012800543B2

(12) United States Patent
Onishi et al.

(10) Patent No.: US 12,800,543 B2
(45) **Date of Patent: *Nov. 17, 2026**

(54) SENSOR ELEMENT OF GAS SENSOR

(71) Applicant: NGK INSULATORS, LTD., Nagoya (JP)

(72) Inventors: Ryo Onishi, Iwakura (JP); Yusuke Watanabe, Nagoya (JP); Takashi Hino, Kasugai (JP); Yasuhide Kojima, Nagoya (JP)

(73) Assignee: NGK INSULATORS, LTD., Nagoya (JP)

(*) Notice: Subject to any disclaimer, the term of this patent is extended or adjusted under 35 U.S.C. 154(b) by 937 days.

This patent is subject to a terminal disclaimer.

(21) Appl. No.: 17/460,780

(22) Filed: Aug. 30, 2021

(65) Prior Publication Data

US 2021/0389271 A1 Dec. 16, 2021

Related U.S. Application Data

(63) Continuation of application No. PCT/JP2020/009601, filed on Mar. 6, 2020.

(30) Foreign Application Priority Data

Mar. 29, 2019 (JP) ................................ 2019-066549

(51) Int. Cl.
*G01N 27/407* (2006.01)
*G01N 27/41* (2006.01)

(52) U.S. Cl.
CPC ..... *G01N 27/4077* (2013.01); *G01N 27/4071* (2013.01); *G01N 27/41* (2013.01)

(58) Field of Classification Search
CPC ......... G01N 27/406–41; G01N 33/0004–0075
See application file for complete search history.

(56) References Cited

U.S. PATENT DOCUMENTS

| | | | | |
|---|---|---|---|---|
| 9,000,758 B2 | 4/2015 | Iwahashi | | |
| 2011/0186431 A1* | 8/2011 | Horisaka ............ | G01N 27/4077 156/89.12 | |

(Continued)

FOREIGN PATENT DOCUMENTS

| | | |
|---|---|---|
| CN | 108693238 A | 10/2018 |
| DE | 10 2017 003 006 A1 | 10/2017 |

(Continued)

OTHER PUBLICATIONS

Sakakibara et al., English translation of JP-2015194479-A, 2015 (Year: 2015).*

(Continued)

*Primary Examiner* — Shizhi Qian
*Assistant Examiner* — Sommer Yousef Osman
(74) *Attorney, Agent, or Firm* — Mattingly & Malur, PC

(57) ABSTRACT

A sensor element includes a porous leading-end protective layer disposed around an outer periphery of an element base in a predetermined range from an end portion on a side where a sensing part is disposed, wherein the protective layer includes: a first layer disposed on two main surfaces of the element base; a second layer disposed to cover the end portion and four side surfaces of the element base including the two main surfaces on which the first layer is disposed; and a third layer disposed to cover the second layer, and having a lower porosity than the second layer, the first layer has a porosity of 40% or more, and L1≥L2 and L1≥L3 where L1, L2, and L3 are extension lengths of the first layer, the second layer, and the third layer, respectively, from an end surface of the element base in a longitudinal direction of the element base.

4 Claims, 5 Drawing Sheets

(56) References Cited

U.S. PATENT DOCUMENTS

| | | | | |
|---|---|---|---|---|
| 2012/0211362 | A1* | 8/2012 | Onkawa ............ | G01N 27/4077 204/424 |
| 2017/0284958 | A1 | 10/2017 | Watanabe et al. | |
| 2018/0284054 | A1 | 10/2018 | Hino | |
| 2018/0284055 | A1 | 10/2018 | Hino | |
| 2019/0317041 | A1* | 10/2019 | Saito .................. | G01N 27/4075 |
| 2020/0041438 | A1 | 2/2020 | Watanabe et al. | |
| 2020/0072784 | A1 | 3/2020 | Watanabe et al. | |

FOREIGN PATENT DOCUMENTS

| | | | | | |
|---|---|---|---|---|---|
| DE | 10 2018 002 459 | A1 | | 10/2018 | |
| JP | 2009080099 | A | * | 4/2009 | ......... G01N 27/4071 |
| JP | 2012-189579 | A | | 10/2012 | |
| JP | 5344375 | B2 | | 11/2013 | |
| JP | 5344675 | W | | 11/2013 | |
| JP | 2015194479 | A | * | 11/2015 | |
| JP | 2017187482 | A | * | 10/2017 | ......... G01N 27/4074 |
| JP | 2018-169324 | A | | 11/2018 | |
| JP | 2020-020738 | A | | 2/2020 | |
| JP | 2020-034443 | A | | 3/2020 | |

OTHER PUBLICATIONS

Iwai et al., English translation of JP-2017187482-A, 2017 (Year: 2017).*

Toguchi et al., English translation of JP2009080099A, 2009 (Year: 2009).*

Unexamined U.S. Appl. No. 17/460,752, filed Aug. 30, 2021.

Unexamined U.S. Appl. No. 17/460,763, filed Aug. 30, 2021.

Unexamined U.S. Appl. No. 17/460,770, filed Aug. 30, 2021.

International Search Report of PCT/JP2020/009601 dated Jun. 2, 2020.

Chinese Office Action received in corresponding Chinese Application No. 202080017366.3 dated Jan. 11, 2024.

German Office Action received in corresponding German Application No. 11 2020 001 640.4 dated Dec. 18, 2025.

* cited by examiner

SENSOR ELEMENT OF GAS SENSOR

CROSS-REFERENCE TO RELATED APPLICATION

This application is a continuation application of PCT/JP2020/009601, filed on Mar. 6, 2020, which claims the benefit of priority of Japanese Patent Application No. 2019-066549, filed on Mar. 29, 2019, the entire contents of which are incorporated herein by reference.

BACKGROUND OF THE INVENTION

Field of the Invention

The present invention relates to a sensor element of a gas sensor and, in particular, to a surface protective layer thereof.

Description of the Background Art

As a gas sensor for determining concentration of a desired gas component contained in a measurement gas, such as an exhaust gas from an internal combustion engine, a gas sensor that includes a sensor element made of an oxygen-ion conductive solid electrolyte, such as zirconia ($ZrO_2$), and including some electrodes on the surface and the inside thereof has been widely known. As the sensor element, a sensor element having an elongated planar shape and including a protective layer formed of a porous body (porous protective layer) in an end portion in which a part for introducing the measurement gas is provided has been known (see Japanese Patent No. 5344675, for example).

The protective layer is provided to the surface of the sensor element to secure water resistance of the sensor element when the gas sensor is in use. Specifically, the protective layer is provided to prevent water-induced cracking of the sensor element under the action of thermal shock caused by heat (cold) from water droplets adhering to the surface of the sensor element.

When such a protective layer is provided to improve thermal shock resistance, however, heat capacity of the sensor element as a whole increases, and force of constraint on the sensor element increases. This leads to poor rapid heat-up performance of the sensor element. Depending on the environment of use of the gas sensor, the protective film can be detached from the sensor element due to a vibration caused in the environment, so that it is necessary to secure adhesion of the protective layer.

Furthermore, if water having adhered to the protective layer and condensed when the gas sensor is in use remains in the protective layer even after use, the water evaporates with heating up of the sensor element at the start of second use, to cause volume expansion in the protective layer to thereby cause separation of the protective layer.

SUMMARY

The present invention relates to a sensor element of a gas sensor and, in particular, to a surface protective layer thereof.

According to the present invention, a sensor element of a gas sensor includes: an element base being a ceramic structure including a sensing part to sense a gas component to be measured; and a leading-end protective layer being a porous layer disposed around an outer periphery of the element base in a predetermined range from an end portion on a side where the sensing part is disposed. The leading-end protective layer includes: a first leading-end protective layer disposed on two main surfaces of the element base; a second leading-end protective layer disposed to cover the end portion and four side surfaces of the element base including the two main surfaces on which the first leading-end protective layer is disposed; and a third leading-end protective layer disposed to cover the second leading-end protective layer, and having a lower porosity than the second leading-end protective layer, the first leading-end protective layer has a porosity of 40% or more, and $L1 \geq L2$ and $L1 \geq L3$ where L1, L2, and L3 are extension lengths of the first leading-end protective layer, the second leading-end protective layer, and the third leading-end protective layer, respectively, from an end surface of the element base in a longitudinal direction of the element base.

According to the present invention, a sensor element of a gas sensor is achieved in which separation-at-evaporation of the leading-end protective layer due to evaporation of water entering into the leading-end protective layer with heating up is suitably suppressed.

It is therefore an object to provide a sensor element of a gas sensor in which separation of a protective layer due to evaporation of water vapor at heating up is suitably suppressed.

DESCRIPTION OF THE PREFERRED EMBODIMENTS

<Overview of Sensor Element and Gas Sensor>

Figure 1:
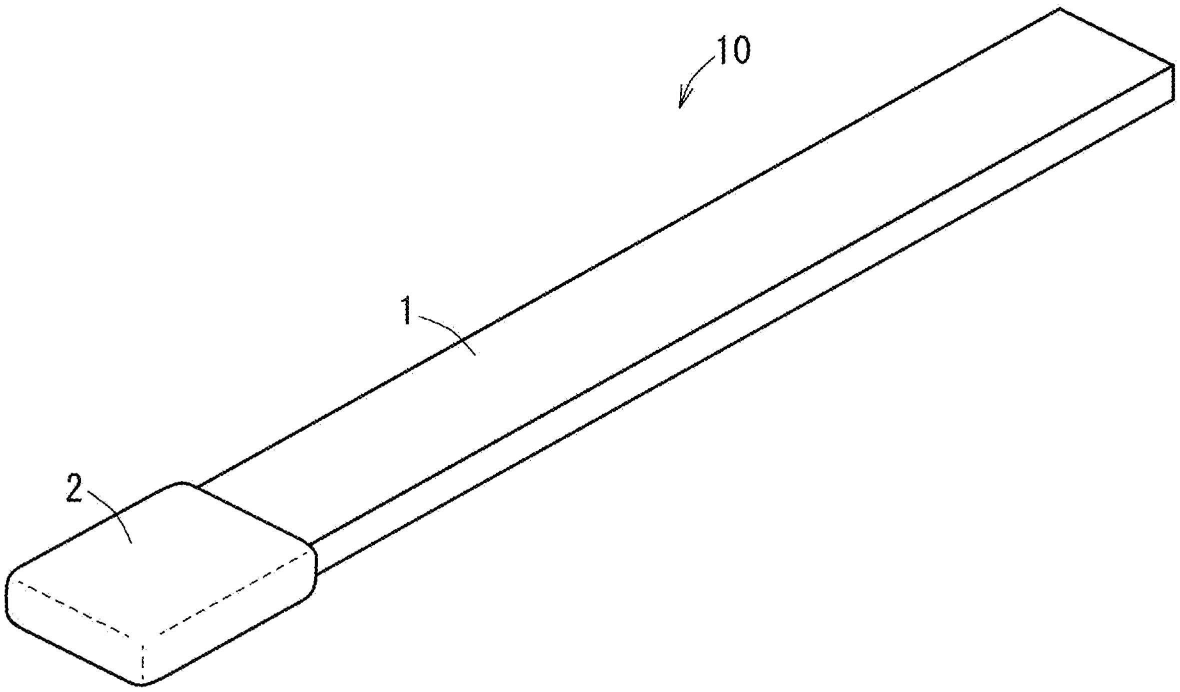
FIG. 1 is a schematic external perspective view of a sensor element 10.
Figure 2:
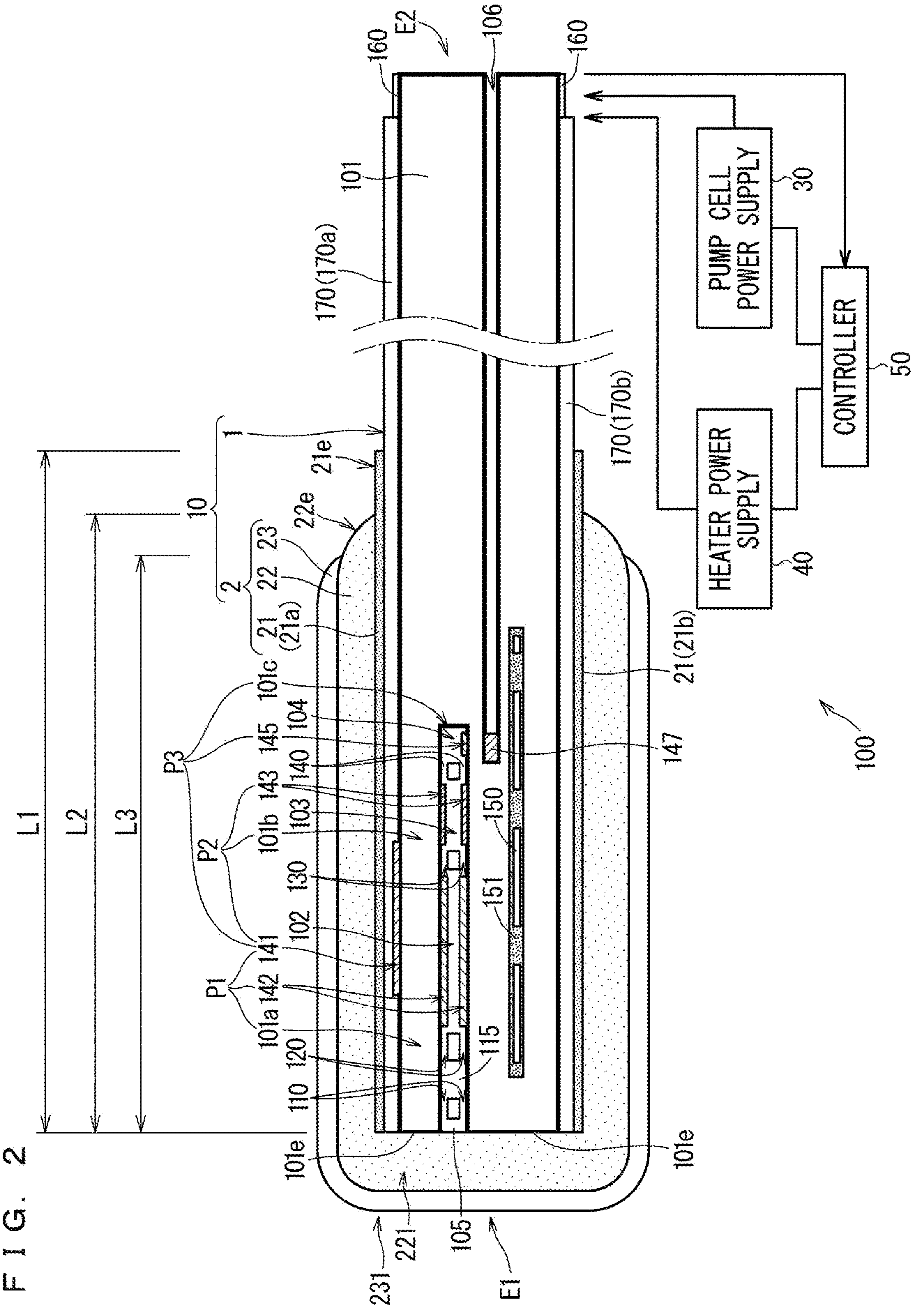
FIG. 2 is a schematic view illustrating a configuration of a gas sensor 100 including a sectional view taken along a longitudinal direction of the sensor element 10.

FIG. 1 is a schematic external perspective view of a sensor element (gas sensor element) 10 according to an embodiment of the present invention. FIG. 2 is a schematic view illustrating a configuration of a gas sensor 100 including a sectional view taken along a longitudinal direction of the sensor element 10. The sensor element 10 is a ceramic structure as a main component of the gas sensor 100 sensing a predetermined gas component in a measurement gas, and measuring concentration thereof. The sensor element 10 is a so-called limiting current gas sensor element.

In addition to the sensor element 10, the gas sensor 100 mainly includes a pump cell power supply 30, a heater power supply 40, and a controller 50.

As illustrated in FIG. 1, the sensor element 10 has a configuration in which one end portion of an elongated planar element base 1 is covered with a porous leading-end protective layer 2. The leading-end protective layer 2 includes three layers: a first leading-end protective layer 21, a second leading-end protective layer 22, and a third leading-end protective layer 23. Details of the leading-end protective layer 2 will be described later.

As illustrated in FIG. 2, the element base 1 includes an elongated planar ceramic body 101 as a main structure, main surface protective layers 170 are provided on two main surfaces of the ceramic body 101, and, in the sensor element 10, the leading-end protective layer 2 is further provided outside both an end surface (a leading end surface 101*e* of the ceramic body 101) and four side surfaces in one leading end portion. The four side surfaces other than opposite end surfaces in the longitudinal direction of the sensor element 10 (or the element base 1, or the ceramic body 101) are hereinafter simply referred to as side surfaces of the sensor element 10 (or the element base 1, or the ceramic body 101).

The ceramic body 101 is made of ceramic containing, as a main component, zirconia (yttrium stabilized zirconia), which is an oxygen-ion conductive solid electrolyte. Various components of the sensor element 10 are provided outside and inside the ceramic body 101. The ceramic body 101 having the configuration is dense and airtight. The configuration of the sensor element 10 illustrated in FIG. 2 is just an example, and a specific configuration of the sensor element 10 is not limited to this configuration.

The sensor element 10 illustrated in FIG. 2 is a so-called serial three-chamber structure type gas sensor element including a first internal chamber 102, a second internal chamber 103, and a third internal chamber 104 inside the ceramic body 101. That is to say, in the sensor element 10, the first internal chamber 102 communicates, through a first diffusion control part 110 and a second diffusion control part 120, with a gas inlet 105 opening to the outside on a side of one end portion E1 of the ceramic body 101 (to be precise, communicating with the outside through the leading-end protective layer 2), the second internal chamber 103 communicates with the first internal chamber 102 through a third diffusion control part 130, and the third internal chamber 104 communicates with the second internal chamber 103 through a fourth diffusion control part 140. A path from the gas inlet 105 to the third internal chamber 104 is also referred to as a gas distribution part. In the sensor element 10 according to the present embodiment, the gas distribution part is provided straight along the longitudinal direction of the ceramic body 101.

The first diffusion control part 110, the second diffusion control part 120, the third diffusion control part 130, and the fourth diffusion control part 140 are each provided as two slits vertically arranged in FIG. 2. The first diffusion control part 110, the second diffusion control part 120, the third diffusion control part 130, and the fourth diffusion control part 140 provide predetermined diffusion resistance to a measurement gas passing therethrough. A buffer space 115 having an effect of buffering pulsation of the measurement gas is provided between the first diffusion control part 110 and the second diffusion control part 120.

An outer pump electrode 141 is provided on an outer surface of the ceramic body 101, and an inner pump electrode 142 is provided in the first internal chamber 102. Furthermore, an auxiliary pump electrode 143 is provided in the second internal chamber 103, and a measurement electrode 145 as a sensing part to directly sense a gas component to be measured is provided in the third internal chamber 104. In addition, a reference gas inlet 106 which communicates with the outside and through which a reference gas is introduced is provided on a side of the other end portion E2 of the ceramic body 101, and a reference electrode 147 is provided in the reference gas inlet 106.

In a case where a target of measurement of the sensor element 10 is NOx in the measurement gas, for example, concentration of a NOx gas in the measurement gas is calculated by a process as described below.

First, the measurement gas introduced into the first internal chamber 102 is adjusted to have a substantially constant oxygen concentration by a pumping action (pumping in or out of oxygen) of a main pump cell P1, and then introduced into the second internal chamber 103. The main pump cell P1 is an electrochemical pump cell including the outer pump electrode 141, the inner pump electrode 142, and a ceramic layer 101*a* that is a portion of the ceramic body 101 existing between these electrodes. In the second internal chamber 103, oxygen in the measurement gas is pumped out of the element by a pumping action of an auxiliary pump cell P2, which is also an electrochemical pump cell, so that the measurement gas is at a sufficiently low oxygen partial pressure. The auxiliary pump cell P2 includes the outer pump electrode 141, the auxiliary pump electrode 143, and a ceramic layer 101*b* that is a portion of the ceramic body 101 existing between these electrodes.

The outer pump electrode 141, the inner pump electrode 142, and the auxiliary pump electrode 143 are each formed as a porous cermet electrode (e.g., a cermet electrode made of $ZrO_2$ and Pt that contains Au of 1%). The inner pump electrode 142 and the auxiliary pump electrode 143 to be in contact with the measurement gas are each formed using a material having weakened or no reducing ability with respect to a NOx component in the measurement gas.

NOx in the measurement gas caused by the auxiliary pump cell P2 to be at a low oxygen partial pressure is introduced into the third internal chamber 104, and reduced or decomposed by the measurement electrode 145 provided in the third internal chamber 104. The measurement electrode 145 is a porous cermet electrode also functioning as a NOx reduction catalyst that reduces NOx existing in an atmosphere in the third internal chamber 104. During the reduction or decomposition, a potential difference between the measurement electrode 145 and the reference electrode 147 is maintained constant. Oxygen ions generated by the above-mentioned reduction or decomposition are pumped out of the element by a measurement pump cell P3. The measurement pump cell P3 includes the outer pump electrode 141, the measurement electrode 145, and a ceramic layer 101*c* that is a portion of the ceramic body 101 existing between these electrodes. The measurement pump cell P3 is an electrochemical pump cell pumping out oxygen generated by decomposition of NOx in an atmosphere around the measurement electrode 145.

Pumping (pumping in or out of oxygen) of the main pump cell P1, the auxiliary pump cell P2, and the measurement pump cell P3 is achieved, under control performed by the controller 50, by the pump cell power supply (variable power supply) 30 applying a voltage necessary for pumping across electrodes included in each of the pump cells. In a case of the measurement pump cell P3, a voltage is applied across the outer pump electrode 141 and the measurement electrode 145 so that the potential difference between the measurement electrode 145 and the reference electrode 147 is maintained at a predetermined value. The pump cell power supply 30 is typically provided for each pump cell.

The controller 50 detects a pump current Ip2 flowing between the measurement electrode 145 and the outer pump electrode 141 in accordance with the amount of oxygen pumped out by the measurement pump cell P3, and calculates a NOx concentration in the measurement gas based on a linear relationship between a current value (NOx signal) of the pump current Ip2 and the concentration of decomposed NOx.

The gas sensor 100 preferably includes a plurality of electrochemical sensor cells, which are not illustrated, sensing the potential difference between each pump electrode and the reference electrode 147, and each pump cell is controlled by the controller 50 based on a signal detected by each sensor cell.

In the sensor element 10, a heater 150 is buried in the ceramic body 101. The heater 150 is provided, below the gas distribution part in FIG. 2, over a range from the vicinity of the one end portion E1 at least to a location of formation of the measurement electrode 145 and the reference electrode 147. The heater 150 is provided mainly to heat the sensor element 10 to enhance oxygen-ion conductivity of the solid electrolyte forming the ceramic body 101 when the sensor element 10 is in use. More particularly, the heater 150 is provided to be surrounded by an insulating layer 151.

The heater 150 is a resistance heating body made, for example, of platinum. The heater 150 generates heat by being powered from the heater power supply 40 under control performed by the controller 50.

The sensor element 10 according to the present embodiment is heated by the heater 150 when being in use so that the temperature at least in a range from the first internal chamber 102 to the second internal chamber 103 is at or above 500° C. In some cases, the sensor element 10 is heated so that the temperature of the gas distribution part as a whole from the gas inlet 105 to the third internal chamber 104 is at or above 500° C. These are to enhance the oxygen-ion conductivity of the solid electrolyte forming each pump cell and to desirably demonstrate the ability of each pump cell. In this case, the temperature in the vicinity of the first internal chamber 102, which is at the highest temperature, is approximately at 700° C. to 800° C. A set heating temperature of the heater 150 when the sensor element 10 is driven is also referred to as an element driving temperature.

In the following description, from among the two main surfaces of the ceramic body 101, a main surface (or an outer surface of the sensor element 10 having the main surface) which is located on an upper side in FIG. 2 and on a side where the main pump cell P1, the auxiliary pump cell P2, and the measurement pump cell P3 are mainly provided is also referred to as a pump surface, and a main surface (or an outer surface of the sensor element 10 having the main surface) which is located on a lower side in FIG. 2 and on a side where the heater 150 is provided is also referred to as a heater surface. In other words, the pump surface is a main surface closer to the gas inlet 105, the three internal chambers, and the pump cells than to the heater 150, and the heater surface is a main surface closer to the heater 150 than to the gas inlet 105, the three internal chambers, and the pump cells.

A plurality of electrode terminals 160 are formed on the respective main surfaces of the ceramic body 101 on the side of the other end portion E2 to establish electrical connection between the sensor element 10 and the outside. These electrode terminals 160 are electrically connected to the above-mentioned five electrodes, opposite ends of the heater 150, and a lead for detecting heater resistance, which is not illustrated, through leads provided inside the ceramic body 101, which are not illustrated, to have a predetermined correspondence relationship. Application of a voltage from the pump cell power supply 30 to each pump cell of the sensor element 10 and heating by the heater 150 by being powered from the heater power supply 40 are thus performed through the electrode terminals 160.

The sensor element 10 further includes the above-mentioned main surface protective layers 170 (170*a* and 170*b*) on the pump surface and the heater surface of the ceramic body 101. The main surface protective layers 170 are layers made of alumina, having a thickness of approximately 5 μm to 30 μm, and including pores with a porosity of approximately 20% to 40%, and are provided to prevent adherence of any foreign matter and poisoning substances to the main surfaces (the pump surface and the heater surface) of the ceramic body 101 and the outer pump electrode 141 provided on the pump surface. The main surface protective layer 170*a* on the pump surface thus functions as a pump electrode protective layer for protecting the outer pump electrode 141.

In the present embodiment, the porosity is obtained by applying a known image processing method (e.g., binarization processing) to a scanning electron microscope (SEM) image of an evaluation target.

The main surface protective layers 170 are provided over substantially all of the pump surface and the heater surface except that the electrode terminals 160 are partially exposed in FIG. 2, but this is just an example. The main surface protective layers 170 may locally be provided in the vicinity of the outer pump electrode 141 on the side of the one end portion E1 compared with the case illustrated in FIG. 2.

<Details of Leading-End Protective Layer>

In the sensor element 10, the leading-end protective layer 2 is provided around an outermost periphery of the element base 1 having a configuration as described above in a predetermined range from the one end portion E1.

The leading-end protective layer 2 is provided in a manner of surrounding a portion of the element base 1 in which the temperature is high (up to approximately 700° C. to 800° C.) when the gas sensor 100 is in use, in order to secure water resistance in the portion to thereby suppress the occurrence of cracking (water-induced cracking) of the element base 1 due to thermal shock caused by local temperature reduction upon direct exposure of the portion to water.

In addition, the leading-end protective layer 2 is provided to secure poisoning resistance to prevent poisoning substances, such as Mg, from entering into the sensor element 10.

On the other hand, providing the leading-end protective layer 2 is, in general, not necessarily advisable in terms of rapid heat-up performance as it increases heat capacity of the sensor element 10, and increases force of constraint on the element base 1. In the present embodiment, a configuration of the leading-end protective layer 2 is determined in light of securement of rapid heat-up performance.

Specifically, in the sensor element 10 according to the present embodiment, the leading-end protective layer 2 includes the three layers: the first leading-end protective layer 21, the second leading-end protective layer 22, and the third leading-end protective layer 23 as illustrated in FIG. 2.

The first leading-end protective layer 21 is an underlying layer provided to secure bonding (adhesion) of the second leading-end protective layer 22 formed thereon (further the third leading-end protective layer 23) to the element base 1. The first leading-end protective layer 21 is provided at least on two main surfaces of the element base 1 on a side of the pump surface and a side of the heater surface. That is to say, the first leading-end protective layer 21 includes a first leading-end protective layer 21*a* on the side of the pump surface and a first leading-end protective layer 21*b* on the side of the heater surface.

The first leading-end protective layer 21, however, is not provided on the leading end surface 101*e* and side surfaces of the ceramic body 101 (of the element base 1). This is to reduce the force of constraint on the element base 1 so as not to impair rapid heat-up performance while securing adhesion.

The first leading-end protective layer 21 is made of alumina, has a porosity of 40% or more, and has a thickness of 20 μm to 60 μm. In contrast to the second leading-end protective layer 22 and the third leading-end protective layer 23, the first leading-end protective layer 21 is formed along with the element base 1 in a process of manufacturing the element base 1 as described below. The first leading-end protective layer 21 preferably has a porosity of 40% or more and 60% or less.

The second leading-end protective layer 22 and the third leading-end protective layer 23 are provided in this order from inside to cover the leading end surface 101*e* and the four side surfaces on the side of the one leading end portion E1 of the element base 1 (around an outer periphery of the element base 1 on the side of the one leading end portion E1). A portion of the second leading-end protective layer 22 on the side of the leading end surface 101*e* is particularly referred to as a leading-end portion 221, and a portion of the second leading-end protective layer 22 on the side of the pump surface and the side of the heater surface is particularly referred to as a main surface portion 222. Similarly, a portion of the third leading-end protective layer 23 on the side of the leading end surface 101*e* is particularly referred to as a leading-end portion 231, and a portion of the third leading-end protective layer 23 on the side of the pump surface and the side of the heater surface is particularly referred to as a main surface portion 232.

The second leading-end protective layer 22 is made of alumina, has a porosity of 20% or more, and has a thickness of 200 μm to 800 μm. The second leading-end protective layer 22 preferably has a porosity of 40% to 80%. The third leading-end protective layer 23 is made of alumina, has a thickness of 100 μm to 400 μm, and has a value of porosity of 10% to 35% to have a value of porosity lower than that of the second leading-end protective layer 22. The leading-end protective layer 2 thereby has a configuration in which the second leading-end protective layer 22 having the lowest thermal conductivity of the three layers is covered with the third leading-end protective layer 23 provided as an outermost layer to have a lower porosity than the second leading-end protective layer 22.

In other words, the second leading-end protective layer 22 is provided as a layer having low thermal conductivity to have a function (a thermal insulating effect) to suppress heat conduction from the outside to the element base 1, and the third leading-end protective layer 23 has a function to maintain overall strength and a function to suppress ingress of water. The leading-end protective layer 2 has this configuration so that, even if water adheres to the surface (the surface of the third leading-end protective layer 23) when the sensor element 10 at a high temperature is in use, ingress of water is suppressed, and cold caused by rapid cooling associated with adherence is less likely to be transferred to the element base 1. That is to say, the leading-end protective layer 2 has excellent thermal shock resistance. As a result, the sensor element 10 is less likely to cause water-induced cracking, and has excellent water resistance.

In addition, the sensor element 10 according to the present embodiment is provided so that the second leading-end protective layer 22 and the third leading-end protective layer 23 have thicknesses and porosities in the above-mentioned ranges to secure heat-up performance (rapid heat-up performance) at driving. That is to say, the sensor element 10 according to the present embodiment has two opposing features of having thermal shock resistance (water resistance) and securing heat-up performance. In the present embodiment, heat-up performance of the sensor element 10 can be evaluated by a time from the start of heating of the sensor element 10 as a whole including the leading-end protective layer 2 using the heater 150 provided inside the sensor element 10 to start use of the gas sensor 100 until the temperature of the sensor element 10 reaches a predetermined temperature (e.g., a time until the temperature of the heater 150 reaches the element driving temperature).

However, an excessive increase in thickness of each of the second leading-end protective layer 22 and the third leading-end protective layer 23 is not preferable because it increases a thermal load put on the heater 150 at heating up, and, as a result, cracking of the sensor element 10 may occur. From this viewpoint, the second leading-end protective layer 22 preferably has a thickness of 700 μm or less, and the third leading-end protective layer 23 preferably has a thickness of 300 μm or less.

The second leading-end protective layer 22 and the third leading-end protective layer 23 are formed by sequentially thermal spraying (plasma-spraying) materials for them with respect to the element base 1 having a surface on which the first leading-end protective layer 21 has been formed. This is to develop an anchoring effect between the second leading-end protective layer 22 and the first leading-end protective layer 21 formed in advance in the process of manufacturing the element base 1 to thereby secure bonding (adhesion) of the second leading-end protective layer 22 (including the third leading-end protective layer 23 formed outside the second leading-end protective layer 22) to the first leading-end protective layer 21. In other words, the first leading-end protective layer 21 has a function to secure bonding (adhesion) of the second leading-end protective layer 22. Bonding (adhesion) secured in this manner suitably suppresses separation of the leading-end protective layer 2 from the element base 1 caused by thermal shock due to adherence of water droplets.

In addition, in the gas sensor 100 according to the present embodiment, separation (hereinafter, separation-at-evaporation) of the leading-end protective layer 2 due to a pressure increase inside the leading-end protective layer 2 caused by evaporation of water, which has adhered to the leading-end protective layer 2, condensed, and entered into the leading-end protective layer 2 when the gas sensor 100 is in use, with heating up of the sensor element 10 at the start of second use, is suitably suppressed.

Although the third leading-end protective layer 23 has the function to suppress ingress of water into the sensor element 10 in the gas sensor 100 according to the present embodiment as described above, it is difficult to completely block ingress of water into the leading-end protective layer 2, and ingress of some water can occur as long as the third leading-end protective layer 23 is a porous layer. The above-mentioned separation-at-evaporation is a phenomenon occurring due to ingress of water into the leading-end protective layer 2 as described above.

In the gas sensor 100 according to the present embodiment, the separation-at-evaporation is preferably suppressed by suitably setting ranges of arrangement of the first leading-end protective layer 21, the second leading-end protective layer 22, and the third leading-end protective layer 23 constituting the leading-end protective layer 2 in the longitudinal direction of the element.

Specifically, when extension lengths of the first leading-end protective layer 21, the second leading-end protective layer 22, and the third leading-end protective layer 23 from the leading end surface 101*e* (end surface of the element base 1) in the longitudinal direction of the element are respectively defined as a first layer length L1, a second layer length L2, and a third layer length L3 as illustrated in FIG. 2, the first leading-end protective layer 21, the second leading-end protective layer 22, and the third leading-end protective layer 23 are provided to satisfy the following conditions:

$$L1 \geq L2 \text{ and } L1 \geq L3 \tag{1}$$

The conditions (1) mean that the leading-end protective layer 2 is formed to at least expose an end surface 21*e* of the first leading-end protective layer 21 on a side opposite the side of the one end portion E1 in the longitudinal direction of the sensor element 10.

Furthermore, the third leading-end protective layer 23 is provided to surround the element base 1 at least in a range where the temperature is at or above 500° C. when the sensor element 10 is driven (when the heater 150 performs heating at the element driving temperature). The range is typically determined in advance at the design of the sensor element 10. The range at least includes a range from the leading end surface 101*e* of the ceramic body 101 to the location of an innermost portion of the third internal chamber 104 in the longitudinal direction of the element.

By arranging the first leading-end protective layer 21, the second leading-end protective layer 22, and the third leading-end protective layer 23 in these ranges, the sensor element 10 has a configuration in which a portion of the leading-end protective layer 2 having a high porosity directly communicates with the outside. Thus, even if water vapor is generated in the leading-end protective layer 2 by heating, the water vapor is relatively easily discharged to the outside mainly from the portion having a high porosity without remaining in the leading-end protective layer 2. An increase in water vapor pressure and, further, separation-at-evaporation due to the increase in water vapor pressure are thus less likely to occur in the leading-end protective layer 2.

The first leading-end protective layer 21, the second leading-end protective layer 22, and the third leading-end protective layer 23 may be provided to satisfy the following condition:

$$L1 \geq L2 \geq L3 \tag{2}$$

FIG. 2 illustrates a case where the condition (2) is satisfied (more particularly, a case where a condition L1>L2>L3 is satisfied). In this case, not only the end surface 21*e* of the first leading-end protective layer 21 but also an end surface 22*e* of the second leading-end protective layer 22 is exposed to make separation-at-evaporation even less likely to occur.

Alternatively, the first leading-end protective layer 21, the second leading-end protective layer 22, and the third leading-end protective layer 23 may be provided to satisfy the following condition:

$$L1 \geq L3 \geq L2 \tag{3}$$

In this case, the end surface 21*e* of the first leading-end protective layer 21 is exposed, but the end surface 22*e* of the second leading-end protective layer 22 is not exposed, so that ingress of water from the latter is suppressed, and separation-at-evaporation is less likely to occur.

As described above, in the sensor element 10 according to the present embodiment, the leading-end protective layer 2 to surround the portion of the element base 1 in which the temperature is high when the gas sensor 100 is in use has a three-layer structure including the first leading-end protective layer 21, the second leading-end protective layer 22, and the third leading-end protective layer 23, and these layers are provided to have predetermined porosities and thicknesses, so that the first leading-end protective layer 21 has the function to secure bonding (adhesion) of the second leading-end protective layer 22, the second leading-end protective layer 22 has the function to suppress heat conduction from the outside to the element base 1, and the third leading-end protective layer 23 has the function to maintain overall strength and the function to suppress ingress of water. The sensor element 10 thus secures both thermal shock resistance and heat-up performance while securing adhesion of the leading-end protective layer.

In addition, by suitably setting the ranges of arrangement of the respective layers of the leading-end protective layer 2 in the longitudinal direction of the element, separation-at-evaporation of the leading-end protective layer 2 caused by evaporation of water having entered into the sensor element 10 with heating up of the sensor element 10 is suitably suppressed.

<Process of Manufacturing Sensor Element>

Figure 3:
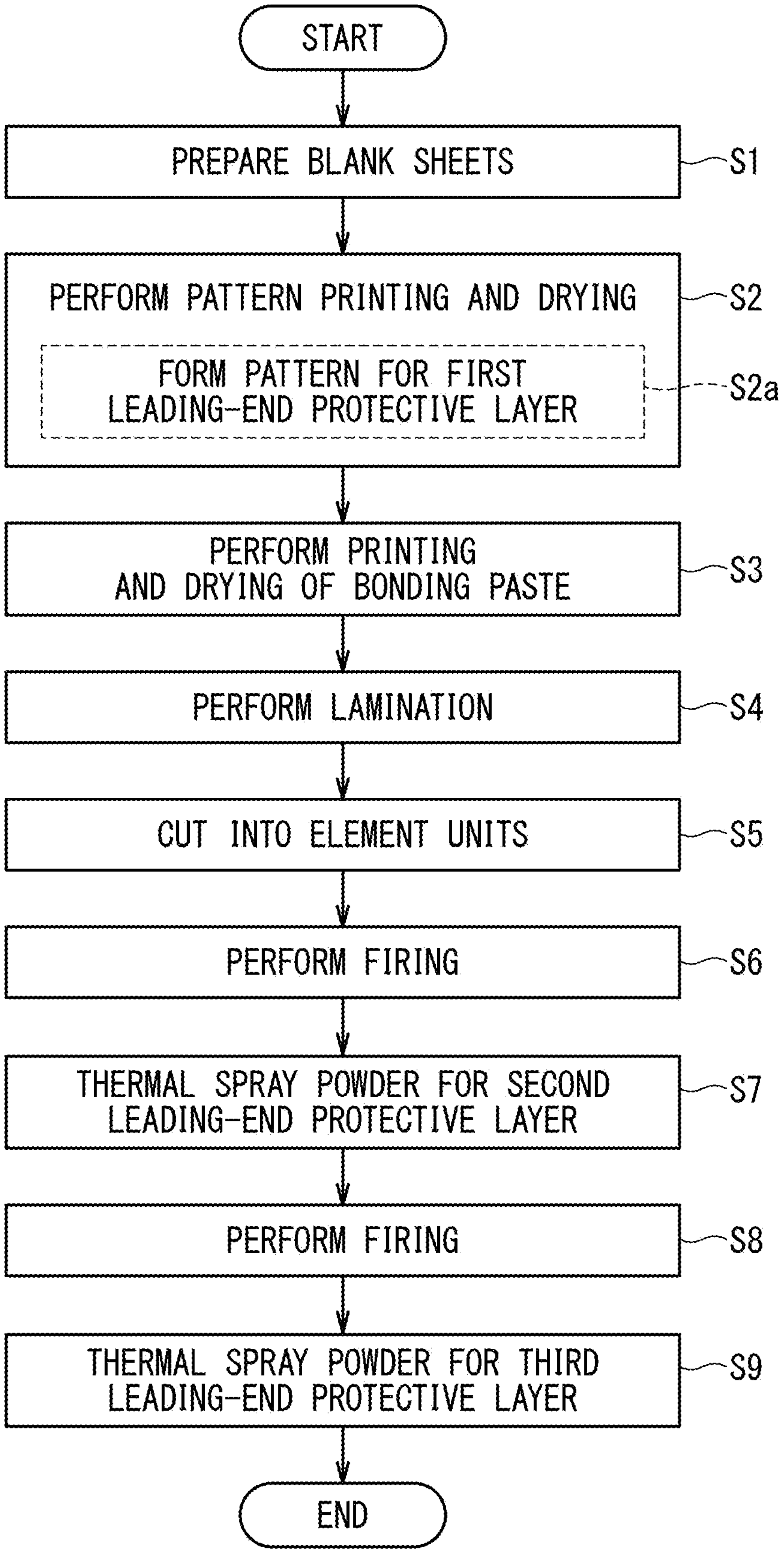
FIG. 3 is a flowchart of processing at the manufacture of the sensor element 10.

One example of a process of manufacturing the sensor element 10 having a configuration and features as described above will be described next. FIG. 3 is a flowchart of processing at the manufacture of the sensor element 10.

At the manufacture of the element base 1, a plurality of blank sheets (not illustrated) being green sheets containing the oxygen-ion conductive solid electrolyte, such as zirconia, as a ceramic component and having no pattern formed thereon are prepared first (step S1).

The blank sheets have a plurality of sheet holes used for positioning in printing and lamination. The sheet holes are formed to the blank sheets in advance prior to pattern formation through, for example, punching by a punching machine. Green sheets corresponding to a portion of the ceramic body 101 in which an internal space is formed also include penetrating portions corresponding to the internal space formed in advance through, for example, punching as described above. The blank sheets are not required to have the same thickness, and may have different thicknesses in accordance with corresponding portions of the element base 1 eventually formed.

After preparation of the blank sheets corresponding to the respective layers, pattern printing and drying are performed on the individual blank sheets (step S2). Specifically, a pattern of various electrodes, a pattern of the heater 150 and the insulating layer 151, a pattern of the electrode terminals 160, a pattern of the main surface protective layers 170, a pattern of internal wiring, which is not illustrated, and the like are formed. Application or placement of a sublimable material (vanishing material) for forming the first diffusion control part 110, the second diffusion control part 120, the third diffusion control part 130, and the fourth diffusion control part 140 is also performed at the time of pattern printing. In addition, a pattern to form the first leading-end protective layer 21 (21*a* and 21*b*) is printed onto blank sheets to become an uppermost layer and a lowermost layer after lamination (step S2*a*).

The patterns are printed by applying pastes for pattern formation prepared in accordance with the properties required for respective formation targets onto the blank sheets using known screen printing technology. At formation of the first leading-end protective layer 21, for example, an alumina paste that can form the first leading-end protective layer 21 having a desired porosity and thickness in the sensor element 10 eventually obtained is used. A known drying means can be used for drying after printing.

After pattern printing on each of the blank sheets, printing and drying of a bonding paste are performed to laminate and bond the green sheets (step S3). The known screen printing technology can be used for printing of the bonding paste, and the known drying means can be used for drying after printing.

The green sheets to which an adhesive has been applied are then stacked in a predetermined order, and the stacked green sheets are crimped under predetermined temperature and pressure conditions to thereby form a laminated body (step S4). Specifically, crimping is performed by stacking and holding the green sheets as a target of lamination on a predetermined lamination jig, which is not illustrated, while positioning the green sheets at the sheet holes, and then heating and pressurizing the green sheets together with the lamination jig using a lamination machine, such as a known hydraulic pressing machine. The pressure, temperature, and time for heating and pressurizing depend on a lamination machine to be used, and these conditions may be determined appropriately to achieve good lamination. The pattern to form the first leading-end protective layer 21 may be formed on the laminated body obtained in this manner.

After the laminated body is obtained as described above, the laminated body is cut out at a plurality of positions to obtain unit bodies eventually becoming the individual element bases 1 (step S5).

The unit bodies as obtained are then each fired at a firing temperature of approximately 1300° C. to 1500° C. (step S6). The element base 1 having main surfaces on which the first leading-end protective layer 21 is provided is thereby manufactured. That is to say, the element base 1 is generated by integrally firing the ceramic body 101 made of the solid electrolyte, the electrodes, and the main surface protective layers 170 along with the first leading-end protective layer 21. Integral firing is performed in this manner, so that the electrodes each have sufficient adhesion strength in the element base 1.

After the element base 1 is manufactured in the above-mentioned manner, the second leading-end protective layer 22 and the third leading-end protective layer 23 are formed with respect to the element base 1. The second leading-end protective layer 22 is formed by thermal spraying powder (alumina powder) for forming the second leading-end protective layer prepared in advance at a position of the element base 1 as a target of formation of the second leading-end protective layer 22 to have an intended thickness (step S7), and then firing the element base 1 on which an applied film has been formed in the above manner (step S8). The alumina powder for forming the second leading-end protective layer contains alumina powder having predetermined particle size distribution and a pore-forming material at a ratio corresponding to a desired porosity, and the pore-forming material is pyrolyzed by firing the element base 1 after thermal spraying to suitably form the second leading-end protective layer 22 having a high porosity of 40% to 80%. Known technology is applicable to thermal spraying and firing.

Upon formation of the second leading-end protective layer 22, powder (alumina powder) for forming the third leading-end protective layer similarly prepared in advance and containing alumina powder having predetermined particle size distribution is thermal sprayed at a position of the element base 1 as a target of formation of the third leading-end protective layer 23 to have an intended thickness (step S9) to thereby form the third leading-end protective layer 23 having a desired porosity. The alumina powder for forming the third leading-end protective layer does not contain the pore-forming material. Known technology is also applicable to the thermal spraying.

The sensor element 10 is obtained by the above-mentioned procedures. The sensor element 10 thus obtained is housed in a predetermined housing, and built into the body (not illustrated) of the gas sensor 100.

<Modifications>

Figure 4:
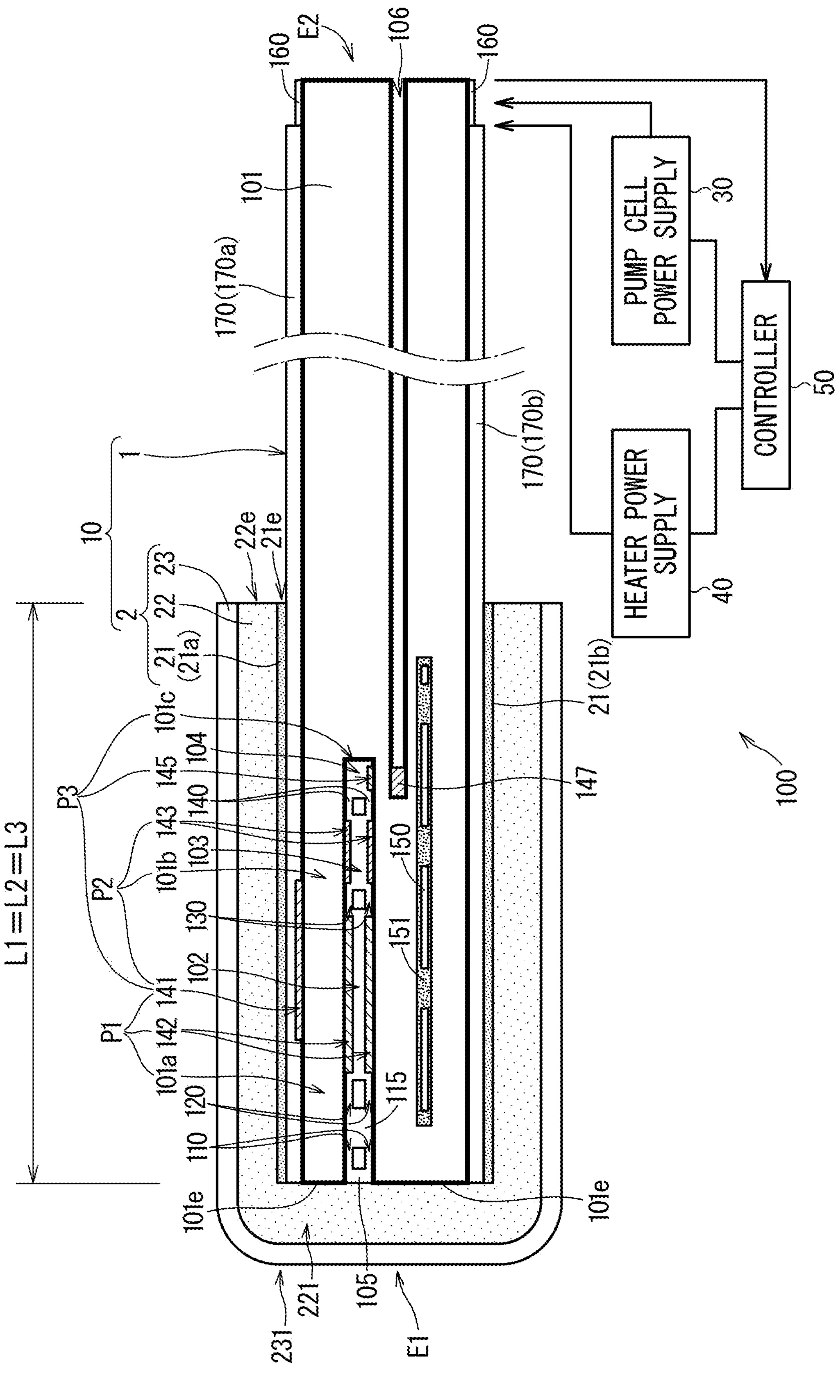
FIG. 4 is a schematic view illustrating a configuration of the gas sensor 100 including a sectional view taken along a longitudinal direction of the sensor element 10 according to a modification.
Figure 5:
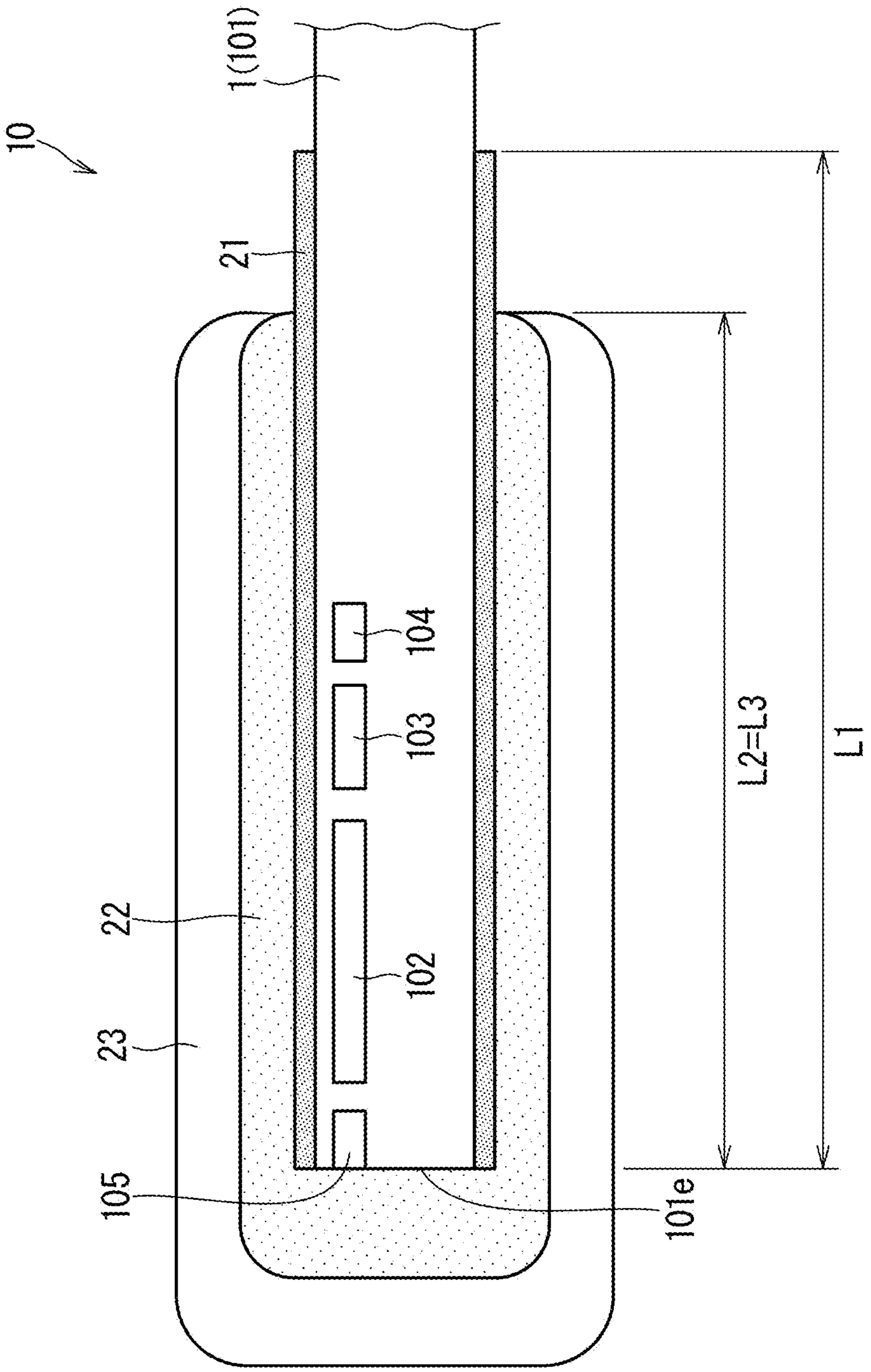
FIG. 5 is a schematic view illustrating a configuration of the gas sensor 100 including a sectional view taken along a longitudinal direction of the sensor element 10 according to a modification.

As described above, the first leading-end protective layer 21, the second leading-end protective layer 22, and the third leading-end protective layer 23 are only required to be provided to satisfy the conditions (1), or further the condition (2) or the condition (3). FIGS. 4 and 5 are each a schematic view illustrating a configuration of the gas sensor 100 including a sectional view taken along a longitudinal direction of the sensor element 10 according to a modification in light of the foregoing.

Specifically, FIG. 4 illustrates the sensor element 10 in a case where a relationship L1=L2=L3 as one example satisfying the condition (2) holds. In the sensor element 10 having the configuration, the end surface 21*e* of the first leading-end protective layer 21 and the end surface 22*e* of the second leading-end protective layer 22 are exposed to the outside, so that the occurrence of separation-at-evaporation is suitably suppressed even if the sensor element 10 is heated up while water remains in the leading-end protective layer 2.

FIG. 5 illustrates the sensor element 10 in a case where a relationship L1>L2=L3 as one example satisfying the condition (2) and the condition (3) holds. In the sensor element 10 having the configuration, the end surface 21*e* of the first leading-end protective layer 21 is exposed to the outside, so that the occurrence of separation-at-evaporation is suitably suppressed even if the sensor element 10 is heated up while water remains in the leading-end protective layer 2.

The above-mentioned embodiment is targeted at a sensor element having three internal chambers, but the sensor element is not necessarily required to have a three-chamber structure. That is to say, the sensor element may have one internal chamber or two internal chambers.

In the above-mentioned embodiment, after thermal spraying of the powder for forming the second leading-end protective layer in step S7, firing in step S8 is performed, and then thermal spraying of the powder for forming the third leading-end protective layer in step S9 is performed, but firing in step S8 and thermal spraying in step S9 may be performed in reverse order.

In the above-mentioned embodiment, the second leading-end protective layer 22 and the third leading-end protective layer 23 are each made of alumina, and the alumina powder is used as a thermal spraying material when these layers are formed, but the second leading-end protective layer 22 and the third leading-end protective layer 23 may not be made of alumina. The second leading-end protective layer 22 and the third leading-end protective layer 23 may be provided using a metal oxide, such as zirconia ($ZrO_2$), spinel ($MgAl_2O_4$), and mullite ($Al_6O_{13}Si_2$), in place of alumina. In this case, powder of these metal oxides may be used as the thermal spraying material.

EXAMPLES

Eight types of sensor elements 10 (Samples Nos. 1 to 8) having different conditions for forming the first leading-end protective layer (hereinafter, first layer) 21, the second leading-end protective layer (hereinafter, second layer) 22, and the third leading-end protective layer (hereinafter, third layer) 23 were manufactured. Specifically, the sensor elements 10 each included the first layer 21, the second layer 22, and the third layer 23 made of alumina, and had different combinations of porosities of the first layer 21 and the second layer 22, the first layer length L1, the second layer length L2, and the third layer length L3. The third layer 23 had a porosity of 25%, and the first layer 21, the second layer 22, and the third layer 23 respectively had a thickness of 40 μm, a thickness of 500 μm, and a thickness of 200 μm.

The porosities of the first layer 21 and the second layer 22, the first layer length L1, the second layer length L2, and the third layer length L3 of each of the sensor elements 10 are shown as a list in Table 1 shown below. In this case, Samples Nos. 1 to 4 and Nos. 6 to 8 each satisfy the conditions (1). Samples Nos. 1 to 4 and No. 6 each satisfy the condition (2) in addition to the conditions (1). On the other hand, Sample No. 7 satisfies the condition (3) in addition to the conditions (1). Sample No. 8 has a configuration illustrated in FIG. 4.

to displace the element base 1 when only the element base 1 was pulled in the longitudinal direction with the leading-end protective layer 2 fixed.

While adhesion could be determined to have no problem when the magnitude of force required to displace the element base 1 was 100 N or more, the magnitude of force of each of the sensor elements 10 was 100 N or more. That is to say, each of the sensor elements 10 had necessary adhesion of the leading-end protective layer 2.

Separation-at-evaporation of the leading-end protective layer 2 of each of the sensor elements 10 in Nos. 1 to 8 was also evaluated. Separation-at-evaporation was evaluated by taking, out of water, each of the sensor elements 10 at a room temperature having been immersed in water for sufficient time, heating the sensor element 10 using the heater 150 to evaporate water, and then observing a cross section of the sensor element 10 after heating with an SEM. In immersion of each of the sensor elements 10 in water in this case, ingress of water into the leading-end protective layer 2 is much more likely to occur than when the gas sensor 100 is in normal use.

The sensor element 10 in which separation of the leading-end protective layer 2 has been observed in an SEM image is determined to undergo (have) separation-at-evaporation, and the sensor element 10 in which separation has not been observed is determined not to undergo (have) separation-at-evaporation. Results of determination relating to separation-at-evaporation are also shown in Table 1. In Table 1, a circle is marked for each of the sensor elements 10 not having separation-at-evaporation, and a cross is marked for each of the sensor elements 10 having separation-at-evaporation.

TABLE 1

| No. | FIRST LAYER POROSITY (%) | SECOND LAYER POROSITY (%) | FIRST LAYER LENGTH L1 (mm) | SECOND LAYER LENGTH L2 (mm) | THIRD LAYER LENGTH L3 (mm) | WITH (x) OR WITHOUT (○) SEPARATION AT EVAPORATION |
|---|---|---|---|---|---|---|
| 1 | 20 | 30 | 13 | 12 | 11 | x |
| 2 | 30 | 20 | 13 | 12 | 11 | x |
| 3 | 40 | 20 | 13 | 12 | 11 | ○ |
| 4 | 40 | 50 | 13 | 12 | 11 | ○ |
| 5 | 40 | 50 | 12 | 11 | 13 | x |
| 6 | 40 | 60 | 13 | 12 | 11 | ○ |
| 7 | 40 | 60 | 13 | 11 | 12 | ○ |
| 8 | 40 | 60 | 11 | 11 | 11 | ○ |

The sensor elements 10 are common in that a range where the temperature is at or above 500° C. at driving is surrounded by the leading-end protective layer 2 while the first layer length L1, the second layer length L2, and the third layer length L3 each have a minimum value of 11 mm.

Heat-up performance of each of the sensor elements 10 in Nos. 1 to 8 as manufactured was evaluated. Heat-up performance was evaluated by the length of a time (heat-up time) from the start of driving of the sensor element 10 at a room temperature until the temperature of the sensor element 10 reaches 850° C. envisioned as the element driving temperature. The temperature of the sensor element 10 was calculated from a value of resistance inside the element.

While heat-up performance could be determined to have no problem when the heat-up time was 30 seconds or less, the heat-up time of each of the sensor elements 10 was 30 seconds or less. That is to say, each of the sensor elements 10 had necessary heat-up performance.

Adhesion of the leading-end protective layer 2 of each of the sensor elements 10 in Nos. 1 to 8 was also evaluated. Adhesion was evaluated by the magnitude of force required As shown in Table 1, separation-at-evaporation did not occur in the sensor elements 10 in Nos. 3, 4, and 6-8 each including the first layer 21 having a porosity of 40% and satisfying the conditions (1).

In contrast, separation-at-evaporation occurred in the sensor elements 10 in Nos. 1 and 2 each including the first layer 21 having a porosity of less than 40% even though they satisfy the conditions (1) and further the condition (2).

Separation-at-evaporation also occurred in the sensor element 10 in No. 5 not satisfying the conditions (1) and the condition (2).

The above-mentioned results show that the sensor element 10 in which the occurrence of separation-at-evaporation is suitably suppressed is achieved when the first layer 21 has a porosity of at least 40%, and the first layer length L1, the second layer length L2, and the third layer length L3 at least satisfy the conditions (1).

What is claimed is:

1. A sensor element of a gas sensor, the sensor element comprising:

an element base being a ceramic structure including a sensing part to sense a gas component to be measured;

a leading-end protective layer being a porous layer disposed around an outer periphery of said element base in a predetermined range from an end portion on a side where said sensing part is disposed, a main surface protective layer being a porous layer and being disposed around an outer periphery of said element base, wherein said main surface protective layer is inside said leading-end protective layer and said leading-end protective layer includes:

a first leading-end protective layer disposed on two main surfaces of said element base, wherein the first leading-end protective layer only covers a partial length of a whole length of said element base in a longitudinal direction of said element base;

a second leading-end protective layer disposed to cover said end portion and four side surfaces of said element base including said two main surfaces on which said first leading-end protective layer is disposed; and a third leading-end protective layer disposed to cover said second leading-end protective layer, and having a lower porosity than said second leading-end protective layer, said first leading-end protective layer has a porosity of 40% or more, and $L1 \geq L2 \geq L3$ where L1, L2, and L3 are extension lengths of said first leading-end protective layer, said second leading-end protective layer, and said third leading-end protective layer, respectively, from an end surface of said element base in the longitudinal direction of said element base, wherein said first leading-end protective layer has a thickness of 20 μm to 60 μm, said second leading-end protective layer has a porosity of 40% to 80%, and a thickness of 200 μm to 800 μm, and said third leading-end protective layer has a porosity of 10% to 35% and a thickness of 100 μm to 400 μm.

2. The sensor element according to claim 1, wherein said first leading-end protective layer has a porosity of 40% to 60%.

3. The sensor element according to claim 2, wherein said third leading-end protective layer surrounds said element base of said sensor element at least in a prespecified range where a temperature is at or above 500° C. at driving.

4. The sensor element according to claim 1, wherein said third leading-end protective layer surrounds said element base of said sensor element at least in a prespecified range where a temperature is at or above 500° C. at driving.

* * * * *